United States Patent Office 3,647,879
Patented Mar. 7, 1972

3,647,879
α-HALOACETYLANILINO-α-ALKOXY-
ACETOPHENONES
Elena Massarani, Dante Nardi, and Ludwig Degen, Milan,
Italy, assignors to Societe d'Exploitations Chimiques et
Pharmaceutiques Seceph S.A., Lugano, Switzerland
No Drawing. Filed July 7, 1969, Ser. No. 839,702
Claims priority, application Switzerland, July 12, 1968,
10,424/68
Int. Cl. C07c 97/10
U.S. Cl. 260—570.5 C                                3 Claims

ABSTRACT OF THE DISCLOSURE

Therapeutically active acetophenone derivatives having the formula

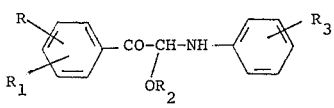

wherein R is hydrogen or chlorine; $R_1$ is hydrogen, chlorine, a nitro group, methyl, methoxy, paraphenyl, paraphenoxy, or paraphenylthio; $R_2$ is hydrogen or an alkyl group of 1 to 12 carbon atoms, allyl, propargyl, benzyl, or cyclohexyl; $R_3$ is a group having the formula

—CO—CHX$_2$ or —CO—CX$_3$, in which X is chlorine or bromine, the radical $R_3$ being fixed in position 3 or 4 of the benzene nucleus and a process for their preparation. Also intermediates thereof.

SUMMARY OF THE INVENTION

The invention relates to new therapeutically active derivatives of acetophenone and to a process for their preparation.

These new derivatives have the general structural formula:

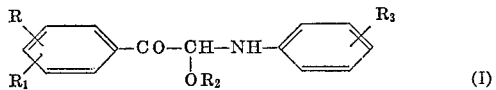

in which R is hydrogen or chlorine; $R_1$ is hydrogen, chlorine, a nitro group, alkyl of 1 to 8 carbon atoms, alkoxy, of 1 to 8 carbon atoms, paraphenyl, paraphenoxy, or paraphenylthio; $R_2$ is hydrogen or an alkyl group of 1 to 12 carbon atoms, alkenyl of 1 to 10 carbon atoms, propargyl, benzyl, or cyclohexyl; $R_3$ is a group having the formula —CO—CHX$_2$ or —CO—CX$_3$, in which X is chlorine or bromine, the radical $R_3$ being fixed in position 3 or 4 of the benzene nucleus.

The preferred compounds, comprised by the structural Formula I above, have the following structural formula:

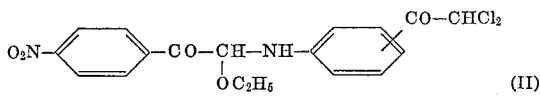

the dichloroacetyl radical being fixed in position 3 or 4 of the benzene nucleus.

In accordance with the invention, the derivatives of acetophenone of Formula I are prepared by reacting a derivative of aniline having the general structural formula:

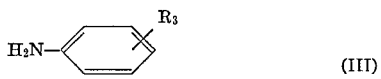

with a hydrate or a semiacetal of alpha-keto-aldehyde having the general formula:

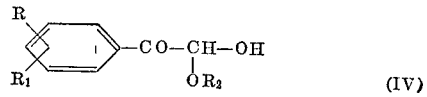

or with an alpha-keto-aldehyde of the general formula:

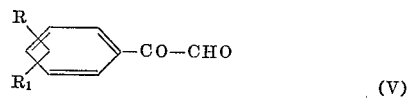

where R, $R_1$, $R_2$, and $R_3$ are as previously defined.

The reaction can be carried out by bringing together approximately equimolecular amounts of the aniline derivative of Formula III and of the compound of Formula IV or V in an inert solvent, at a temperature between normal temperature and the boiling point of the solvent, and for a period of time of between about 15 minutes and 24 hours, depending on the reaction temperature and on the reactivity of the starting materials. Preferably, the reaction time is between 30 minutes and 8 hours at a temperature of about 25 to 100° C.

Advantageously, the inert solvent can be an alcohol of the formula $R_2$—OH, without water when $R_2$ is a hydrocarbon radical. When $R_2$ is hydrogen, the solvent is advantageously non-alcoholic, and preferably an ether, pyridine, or an aromatic or cycloaliphatic solvent.

The desired product is separated from the reaction mixture by distilling the major part of the solvent, cooling the residue, and collecting the precipitate that has formed. The product can be purified by recrystallization.

The starting materials of Formulas IV and V can be prepared by the methods explained in the U.S. Pat. No. 3,095,443. Among these starting materials the alpha-keto aldehydes having the general formula:

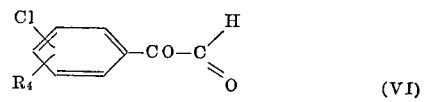

where $R_4$ is hydrogen or a nitro group, are new compounds. These alpha-keto-aldehydes can be prepared in a known manner, notably by oxidation of the corresponding acetophenone with selenium dioxide.

The acetophenones used to prepare the alpha-keto-aldehydes can be obtained by the following reaction:

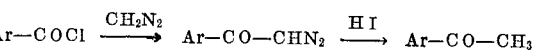

where Ar represents a phenyl radical which may carry the substituents R and $R_1$. Benzoyl chloride is reacted with diazomethane, the diazoketone intermediate being reduced by hydroiodic acid.

The same acetophenones can be prepared by the following reactions:

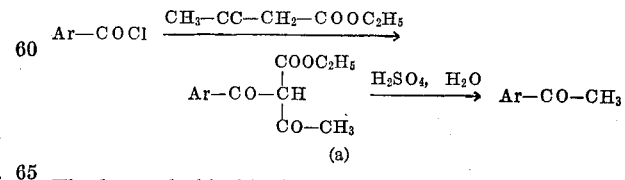

(a)

The benzoyl chloride Ar—COCl is condensed with ethyl acetoacetate in the form of a sodium derivative, and then the alpha-benzoyl ethyl acetoacetate formed intermediately is hydrolyzed. The ethyl benzoylacetate

is also formed as an intermediate by-product.

Another method of preparing the alpha-keto-aldehydes of Formula V is illustrated by the following reaction:

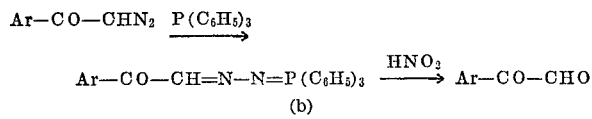

(b)

The diazoketone, obtained by the reaction of diazomethane on benzoyl chloride Ar—COCl previously mentioned, is condensed with triphenylphosphine and triphenylphosphazine (b) formed immediately and decomposed by nitrous acid. To separate the alpha-keto-aldehyde from the reaction mixture, it is advantageously transformed temporarily into 1,3 - diphenyl - 2 - benzoyl-tetrahydro-imidazole by condensing with N,N'-dianilinoethane:

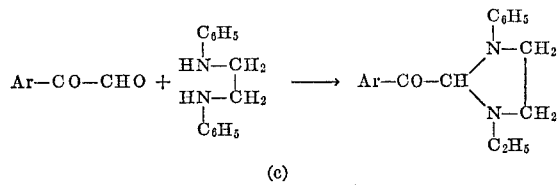

(c)

The alpha-keto-aldehyde is regenerated by hydrolyzing the 1,3-diphenyl-2-benzoyl-tetrahydroimidazole (c).

The alpha-keto-aldehydes of Formula V can be changed into their hydrous form ($R_2$=H) or into a semiacetal of Formula IV by treating with water or the corresponding alcohol, respectively.

The alpha-keto-aldehydes of Formula V, as well as their hydrates and semiacetals of Formula IV, can be purified in the form of their derivatives having the formula:

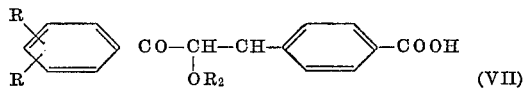

obtained by condensation with para-aminobenzoic acid. The compounds of this formula are new, excepting those in which R is hydrogen and $R_1$ represents a substituent in position 4. In other words, the compounds of Formula VII are new when R is Cl or when R is H then $R_1$ is in the 2, 3, 5 or 6 position.

The meta- or para-halogenoacetyl anilines of Formula III can be obtained in a known manner, notably by reducing the corresponding nitro derivatives. These latter can be prepared either by nitration of the corresponding halogenoacetylbenzene or (when the halogen is chlorine) by chlorination of meta- or para-acetylnitrobenzene.

DESCRIPTION OF THE PREFERRED EMBODIMENTS

The following examples illustrate the invention. All temperatures are given in degrees centigrade.

EXAMPLE I

α - p - Dichloroacetylanilino - α - ethoxy - m - nitroacetophenone (Formula I, R=H, $R_1$=m-$NO_2$, $R_2$=$C_2H_5$, $R_3$=p-CO—$CHCl_2$)

1.79 g. (0.01 mole) of m-nitrophenylglyoxal (Formula V, R=H, $R_1$=m-$NO_2$) dissolved in 20 ml. of boiling anhydrous ethanol are added to 2.04 g. (0.01 mole) of p-dichloroacetylaniline (Formula III, $R_3$=p-CO—$CHCl_2$) dissolved in 20 ml. of boiling anhydrous ethanol. The mixture is refluxed for one hour. After cooling the reaction mixture, it is evaporated to dryness under reduced pressure, the residue recovered while hot with 50 ml. of anhydrous ethanol, treated with carbon black and filtered. On cooling, 3 g. (73% of theory) of a straw yellow product is crystallized. Melting point 114–115°.

*Analysis.*—Calculated for $C_{18}H_{16}Cl_2N_2O_5$ (411.24) (percent): C, 52.57; H, 3.92; N, 6.81; Cl, 17.24. Found (percent): C, 52.19; H, 3.93; N, 6.53; Cl, 16.97.

This substance is soluble in 10% concentration in propylene glycol, soluble cold in acetone, benzene, chloroform, and ethyl ether, and warm in methyl alcohol and ethyl alcohol. It is insoluble in water. The m-nitrophenylglyoxal can be prepared by the method described by S. Steinbach and I. Beker, J. Am. Chem. Soc., vol. 76, 5808 (1954).

The p-dichloroacetylaniline can be prepared by the method described by Cavallini et al., Boll. Chim. Farm., vol. 103, 48 (1964). It can also be prepared by the following method.

To a solution of 234 g. (1 mole) of α,α-dichloro-4-nitroacetophenone in 1 liter of concentrated sulfuric acid there are added, over a period of 30 minutes at 45–50°, 254 g. (4 moles) of copper powder in small amounts. Once all of the copper is added, the mass is held at 40° for one hour and then poured on 5 kg. of ice. Holding the temperature at about 0°, the pH is reduced to 1.8 by adding concentrated ammonia liquor and collecting the formed precipitate by filtering. After air drying the product, it is suspended in 3 liters of anhydrous ether. The base dissolves, the liquor is bleached with charcoal, and then filtered to separate the insoluble residue. The solution is treated with an equal amount of ethanolic HCl, causing the chlorhydrate to precipitate, which is collected by filtration and dried (135 g.). The hydrochloride treated with 500 ml. of water liberates the pure base, which is collected by filtering (82.5) and can be crystallized in benzene/cyclohexane. By neutralizing the end liquor with $NaHCO_3$, there is obtained a precipitate which, after purifying by the intermediate hydrochloride as described above, still furnishes 12 g. of pure base. The latter is a yellow substance melting at 81–83°.

*Analysis.*—Calculated for $C_8H_7Cl_2NO$ (204.05) (percent): C, 47.09; H, 3.46; N, 6.86; Cl, 34.75. Found (percent): C, 47.32; H, 3.50; N, 6.52; Cl, 34.94.

EXAMPLE II

α-m-Dichloroacetylanilino-α-ethoxy-p-nitroacetophenone (Formula I, R=H, $R_1$=p-$NO_2$, $R_2$=$C_2H_5$, $R_3$=m-CO—$CHCl_2$)

120 g (0.5 mole) of m-dichloroacetylaniline (Formula III, $R_2$=m-CO—$CHCl_2$) in the form of chlorhydrate is dissolved in 1500 ml. of water and neutralized with $NaHCO_3$. After extracting with ether, the extract is dried on $Na_2SO_4$. After filtering, a solution of 90 g. (0.5 mole) of anhydrous p-nitrophenylglyoxal (Formula V, R=H, $R_1$=p-$NO_2$) in 1000 ml. of anhydrous ethanol is added to the filtrate. The ether is evaporated, and the solution reflux boiled for 10 minutes. After the reaction mixture has stood for 24 hours it is cooled in the refrigerator and collected by filtering out the crystallized product. Yield: 91 g. Melting point 115–116°.

By alcoholic concentration, there is obtained an additional quantity of the product melting at 110–115°. Combining these two fractions and crystallizing them in about 2000 ml. of anhydrous ethanol, there are obtained 134 g. (69% of theory) of the desired product, yellow color, melting point 116–117°. The p-nitrophenylglyoxal can be prepared by the method described by S. Steinbach and I. Beker, J. Am. Chem. Soc., vol. 76, 5808 (1954).

The m-dichloroacetylaniline can also be prepared in the following manner.

Into a solution of 16.5 g. (0.1 mole) of m-nitroacetophenone in 50 ml. of anhydrous acetic acid there is bubbled a stream of chlorine at 60° until no more chlorine is absorbed (about 3 hours). It is then cooled in a nitrogen stream until all of the chlorine is removed, and next poured into 150 ml. of water containing 1.2 g. of sodium sulphite. An oil separates out, which quickly solidifies and crystallizes in a mixture of ethyl alcohol and water. 18 g. of α,α-dichloro-3-nitroacetophenone are obtained in the form of a white solid melting at 54–55°.

*Analysis.*—Calculated for $C_8H_5Cl_2NO_3$ (234.04) (percent): C, 41.05; H, 2.15; N, 5.99; Cl, 30.30. Found (percent): C, 41.01; H, 2.41; N, 5.84; Cl, 30.16.

To a solution of 35 g. (0.155 mole) of stannous chloride dihydrate in 50 ml. of concentrated hydrochloric acid there are added in one stroke 11.7 g. (0.05 mole) of α,α-dichloro-3-nitroacetophenone, and the reaction mixture is heated in a water bath until the temperature of the mixture rises to 110°, resulting in a limpid solution. It is allowed to cool to normal temperature, and the resulting precipitate, consisting of 16.1 g. of chlorostannate of amine, is collected by filtering. This salt is dissolved in water and neutralized with sodium bicarbonate. The base, extracted with ether, separates out. The extract is dried on $Na_2SO_4$; it is filtered and acidulated with ethanolic HCl. Hydrochloride precipitates and is recovered by filtering. The precipitate is dissolved in cold water, and the hydrochloride of 3-amino-α,α-dichloroacetophenone, or m-dichloroacetylaniline, is crystallized by adding concentrated hydrochloric acid. Yield: 8.4 g. (70% of theory), melting point 185° dec.

*Analysis.*—Calculated for $C_8H_7Cl_2NO \cdot HCl$ (240.52) (percent): C, 39.95; H, 3.35; N, 5.82; Cl, 44.23. Found (percent): C, 39.70; H, 3.47; N, 5.89; Cl, 44.16.

EXAMPLE III

α-p-Dichloroacetylanilino-α-ethoxy-p-nitroacetophenone (Formula I, R=H, $R_1$=p-$NO_2$, $R_2$=$C_2H_5$, $R_3$=p-CO—$CHCl_2$)

A solution of 2.04 g. (0.01 mole) of p-dichloroacetylaniline in 10 ml. of anhydrous ethanol is added to a solution of 1.97 g. (0.01 mole) of p-nitrophenylglyoxal (Formula V, R=H, $R_1$=p-$NO_2$) in 70 ml. of anhydrous ethanol. The solution is allowed to stand for 5 hours at 25°, then is filtered and evaporated to dryness at reduced pressure. The residue is dissolved in warm anhydrous ethanol, and the solution again evaporated under vacuum until dry. The yellow product thus obtained, after washing with a little cold anhydrous ether, melts at 120–121°. Yield: 3.2 g. (75% of theory). This substance is insoluble in water and soluble cold in chloroform, in acetone (10%), propylene glycol (10%), ether, methanol, ethanol, and in benzene.

*Analysis.*—Calculated for $C_{18}H_{16}Cl_2N_2O_5$ (411.240) (percent): C, 52.57; H, 3.92; N, 6.81; Cl, 17.24. Found (percent): C, 52.32; H, 3.88; N, 6.95; Cl, 17.26.

EXAMPLE IV

α-p-Dichloroacetylanilino-α - hydroxy - p - chloroacetophenone (Formula I, R=H, $R_1$=p-Cl, $R_2$=H, $R_3$=p-$COCHCl_2$)

2.04 g. (0.01 mole) of p-dichloroacetylaniline are added to a solution of 1.86 g. (0.01 mole) of p-chlorophenylglyoxal (Formula V, R=H, $R_1$=p-Cl) in 10 ml. of pyridine. After standing at 25° for 10 minutes, 5 ml. of water are added and an oil separates out and is crystallized by cooling. Centrifuging, 3.65 g. (97% of theory) of the desired product are separated, having an ivory color, melting at 125–126°, and being insoluble in water and soluble warm in ether, benzene, and chloroform, and soluble cold in ethanol, methanol, acetone (10%), and propylene glycol (10%).

*Analysis.*—Calculated for $C_{16}H_{12}Cl_3NO_3$ (372.63) (percent): C, 51.57; H, 3.24; N, 3.56; Cl, 28.54. Found (percent): C, 51.30; H, 2.98; N, 3.94; Cl, 28.34.

The p-chlorophenylglyoxal can be prepared as described by Karrer and Musante, Helv. Chim. Acta, vol. 18, 1140 (1935).

EXAMPLE V

α-p-Dichloroacetylanilino - α - ethoxy-p-chloro-m-nitroacetophenone (Formula I, R=p-Cl, $R_1$=m-$NO_2$, $R_2$=$C_2H_5$, $R_3$=p-CO—$CHCl_2$)

2.13 g. (0.01 mole) of m-nitro-p-chlorophenylglyoxal (Formula V, R=p≡Cl, $R_1$=m-$NO_2$) dissolved in 10 ml. of boiling anhydrous ethanol are added to 2.04 g. (0.01 mole) of p-dichloroacetylaniline in 20 ml. of boiling anhydrous ethanol. The mixture is reflux boiled for 1 hr. On cooling, a yellow solid crystallizes and is recovered by filtering. Yield: 3.45 g. (77% of theory), melting point 150–151°. The substance is soluble cold in acetone and chloroform, soluble warm in ethanol and benzene, insoluble in anhydrous ether and 10% soluble in propylene glycol and Carbowax 200 (registered trademark).

*Analysis.*—Calculated for $C_{18}H_{15}Cl_3N_2O_5$ (445.69) (percent): C, 48.51; H, 3.39; N, 6.28; Cl, 23.87. Found (percent): C, 48.57; H, 3.41; N, 6.04; Cl, 23.47.

The m-nitro-p-chlorophenylglyoxal can also be prepared as follows:

A mixture of 19.95 g. (0.1 mole) of m-nitro-p-chloroacetophenone, 16.6 g. (0.15 mole) of selenium dioxide, 50 ml. of acetic acid, and 10 ml. of water are reflux boiled for 1 hour. After having determined by thin-layer chromatography that the starting materials are no longer present in the resulting mixture, the metallic selenium is separated by filtering, the solvent of the filtrate is evaporated cold under vacuum, and the residue is distilled, recovering the fraction boiling at 134°/0.6 mm. Hg. Obtained are 13 g. (60% of theory) of a yellow oil slightly soluble in water and soluble in the usual organic solvents.

*Analysis.*—Calculated for $C_8H_4ClNO_4$ (213.577) (percent): C, 44.99; H, 1.89; N, 6.56; Cl, 16.60. Found (percent): C, 44.30; H, 2.21; N, 6.20; Cl, 16.28.

EXAMPLE VI

α-p-Dichloroacetylanilino - α - hydroxy - p-phenylthioacetophenone (Formula I, R=H, $R_1$=p-$C_6H_5$—S, $R_2$=H, $R_3$=p-CO—$CHCl_2$)

2.04 g. (0.01 mole) of p-dichloroacetylaniline are added to a solution of 2.60 g. (0.01 mole) of p-phenylthio-phenylglyoxal hydrate (Formula IV, R—H, $R_1$=p-$C_6H_5$—S, $R_2$=H) in 10 ml. of pyridine. The mixture stands at 25° for 10 minutes. Petroleum ether is added, obtaining an oil that subsequently solidifies. The solid product is washed several times with anhydrous ethyl ether. Yield: 3.45 g. (77% of theory), melting 121–122°. The substance is white, insoluble in water and ether, soluble in ethanol, methanol, benzene, chloroform, acetone, and propylene glycol.

*Analysis.*—Calculated for $C_{22}H_{17}Cl_2NO_3S$ (446.34) (percent): C, 59.19; H, 3.83; N, 3.13; Cl, 15.88. Found (percent): C, 59.18; H, 3.76; N, 3.33; Cl, 15.66.

The p-phenylthio-phenylglyoxal can be prepared as described by G. Cavallini, J. Med. Chem., vol. 7, 255 (1964).

EXAMPLE VII

α - p - Trichloroacetylaniline - α - ethoxy-p-nitro-acetophenone (Formula I, R=H, $R_1$=p-$NO_2$, $R_2$=$C_2H_5$, $R_3$=p-$COCCl_3$)

1.80 g. (0.01 mole) of anhydrous p-nitrophenylglyoxal (Formula V, R=H, $R_1$=p-$NO_2$) are dissolved in 25 ml. of warm anhydrous ethanol, and the solution allowed to cool to 20–25°, whereupon it is added to a solution of 2.40 g. (0.01 mole) of p-trichloroacetylaniline in 20 ml. of anhydrous ethanol (obtained by dissolution while warm and cooling to 20–25°). The mixture stands at 20–25° for 5 hours, and then is cooled, causing the crystallization of a yellow solid that is recovered by filtering. Yield: 2.75 g., melting point 111–112.5°.

*Analysis.*—Calculated for $C_{18}H_{15}Cl_3N_2O_5$ (445.69) (percent): C, 48.51; H, 3.39; N, 6.28; Cl, 23.87. Found (percent): C, 48.40; H, 3.43; N, 6:10; Cl, 23.81.

The p-trichloroacetylaniline can be prepared as follows:

Over a period of 30 minutes and at temperature of 40°, a solution of 14.2 g. (0.075 mole) of anhydrous stannous chloride in 20 ml. of ethanol saturated with hydrogen chloride is added to a solution of 6.7 g. (0.025 mole) of p-nitro - $\alpha,\alpha,\alpha$ - trichloroacetophenone in 10 ml. of ethanol saturated with hydrogen chloride.

The mixture is agitated for 1 hour while letting it return to room temperature. It is poured into 150 ml. of water and extraction undertaken with ether. The etheric extract is dried on anhydrous $Na_2SO_4$ and evaporated to dryness. The residue is an oil that, by treating with water, gives a solid that can be recovered by filtering, dried, and crystallized in an ethanol-water mixture. Obtained are 20 g. (34% of theory) of a yellow solid, melting at 114–116°, soluble in methanol, ethanol, ether, benzene, acetone, and chloroform, insoluble in water.

*Analysis.*—Calculated for $C_8H_6Cl_3NO$ (238.51) (percent): C, 40.28; H, 2.54; N, 5.87; Cl, 44.61. Found (percent): C, 40.04; H, 2.35; N, 6.17; Cl, 44.47.

The following Table I gives the characteristics of compounds of Formula I that are prepared as described above.

TABLE I

| $R^a$, $R_1$ | $R_2$ | $R_3$ | M.P., °C. |
|---|---|---|---|
| 4-$NO_2$ | $CH_3$ | 3-$COCHCl_2$ | 111 |
| | $nC_3H_7$ | 3-$COCHCl_2$ | 98–99 |
| | $isoC_3H_7$ | 3-$COCHCl_2$ | 111–112 |
| | $nC_4H_9$ | 3-$COCHCl_2$ | 99–100 |
| | $isoC_5H_{11}$ | 3-$COCHCl_2$ | 99–100 |
| | $CH_2CH=CH_2$ | 3-$COCHCl_2$ | 104–105 |
| | $CH_2-C\equiv CH$ | 3-$COCHCl_2$ | 116–118 |
| | $C_{12}H_{25}$ | 3-$COCHCl_2$ | 91–92 |
| | $C_6H_{11}$ | 3-$COCHCl_2$ | 110–112 |
| | $C_6H_5CH_2$ | 3-$COCHCl_2$ | 118–120 |
| | $C_2H_5$ | 3-$COCCl_3$ | 116 |
| | $C_2H_5$ | 4-$COCHBr_2$ | 127.9 |
| 3-Cl | H | 4-$COCHCl_2$ | 126–127 |
| 2-Cl, 5-$NO_2$ | $C_2H_5$ | 4-$COCHCl_2$ | 121–122 |
| H | H | 4-$COCHCl_2$ | 121–122 |
| 4-$CH_3$ | H | 4-$COCHCl_2$ | 121–122 |
| 4-$CH_3O$ | H | 4-$COCHCl_2$ | 139–140 |
| 4-$C_6H_5O$ | H | 4-$COCHCl_2$ | 103–104 |
| 4-$C_6H_5$ | H | 4-$COCHCl_2$ | 139–141 |
| 4-$NO_2$ | $CH_3$ | 4-$COCHCl_2$ | 123–124 |
| | $nC_3H_7$ | 4-$COCHCl_2$ | 102–104 |
| | $isoC_3H_7$ | 4-$COCHCl_2$ | 118 |
| | $CH_2-CH=CH_2$ | 4-$COCHCl_2$ | 110–112 |
| | $CH_2-C\equiv CH_{11}$ | 4-$COCHCl_2$ | 116–117 |
| | $C_6H_{11}$ | 4-$COCHCl_2$ | 113–115 |
| | $C_6H_5CH_2$ | 4-$COCHCl_2$ | 127–129 |
| | $C_2H_5$ | 4-$COCCl_3$ | 111–112 |
| | $C_2H_5$ | 4-$COCHCl_2$ | 114–115 |
| | $C_2H_5$ | 3-$COCHCl_2$ | 116–117 |
| | $C_2H_5$ | 4-$COCHCl_2$ | 120–121 |
| 4-Cl | H | 4-$COCHCl_2$ | 125–126 |
| 4-Cl; 3-$NO_2$ | $C_2H_5$ | 4-$COCHCl_2$ | 150–151 |
| 4-$C_6H_5$—S | H | 4-$COCHCl_2$ | 121–122 | a R=H unless otherwise indicated.

Table II below lists the boiling points of several $\alpha$-keto-aldehydes of Formula V usable for carrying out the process of the invention. All of the compounds listed in Table II are new.

TABLE II

| R | $R_1$ | B.P., °C./mm.Hg. |
|---|---|---|
| H | 3-Cl | 90/1.5 |
| 4-Cl | 2-$NO_2$ | 118/0.4 |
| 5-Cl | 2-$NO_2$ | 128/0.6 |
| 6-Cl | 2-$NO_2$ | 110/0.3 |
| 2-Cl | 4-$NO_2$ | 118/0.5 |
| 2-Cl | 5-$NO_2$ | 137/0.8 |
| 4-Cl | 3-$NO_2$ | 134/0.6 |

The following example describes the preparation of a carboxylic acid of general Formula VII.

EXAMPLE VIII $\alpha$-p-Carboxyanilino-$\alpha$ - ethoxy-o-nitro - p-chloroacetophenone (Formula VII, R=p-Cl, $R_1$=o-$NO_2$, $R_2$=$C_2H_5$)

A mixture of 1.136 g. (0.01 mole) of o-nitro-p-chlorophenylglyoxal (Formula V, R=p-Cl, $R_1$=o-$NO_2$), 1.37 g. (0.01 mole) of p-aminobenzoic acid, and 20 ml. of anhydrous ethanol are reacted for 3 hours at normal temperature and without agitation. After cooling the mixture over night in the refrigerator, the crystals that have formed are collected by filtering. The substance can be crystallized in ethanol. Thus obtained are 2.7 g. (yield 72% of theory) of the desired product, light yellow in color, melting point 231°, soluble warm in ethanol, at all temperatures in acetone, benzene, and chloroform, insoluble in water and ether.

*Analysis.*—Calculated for $C_{17}H_{15}ClN_2O_6$ (378.765) (percent): C, 53.94; H, 3.99; N, 7.40. Found (percent): C, 54.35–53.67; H, 4.28–4.16; N, 7.50.

Table III below lists the melting points of compounds of general Formula VII that can be prepared in a similar manner.

TABLE III

| R | $R_1$ | $R_2$ | P.F., °C. |
|---|---|---|---|
| H | 3-Cl | $C_2H_5$ | 184 |
| 5-Cl | 2-$NO_2$ | $C_2H_5$ | 199–201 |
| 4-Cl | 3-$NO_2$ | $C_2H_5$ | 190 |

The compounds of the present invention are antivirus agents. Tests performed on cultures of influenza and smallpox viruses in an egg with an embryo have proved the activity of these derivatives against these infectious agents. Their activity, furthermore, has been demonstrated in vivo on mice against the influenza virus and the virus of hepatitis $MHV_3$. The following tests are representative.

Biological testing

For all tests NMRI albino mice and Wistar albino rats were used. The acute toxicity of each compound was determined by administering it intraperitoneally to mice in descending doses. Mortality was recorded over 24 hr. and indicative $LD_{50}$ values were estimated.

Maximal tolerated dose (MTD) in the embryonated egg.—The compounds were dissolved in saline solution buffered at pH 7.2 containing 500 IU of penicillin G and 0.5 mg. of streptomycin/ml. Descending doses of each compound dissolved in 0.1 ml. were inoculated into the allantoic sac. Each dose was injected in three embryonated 9-day old eggs. The highest doses which did not provoke mortality within 3 days was defined as the MTD.

Antiviral methods.—Embryonated 9-day-old leghorn hen eggs and influenza A virus [allantoic fluid containing $10^8$–$10^9$ $EID_{50}$ (median egg-infecting dose) of egg-adapted PR–8 strain] were used. Vaccinia mouse neurotropic virus [(ATCC) CAM (chlorioallantoic membrane) homogenized and purified by centrifugation containing $10^6$–$10^7$ $ELD_{50}$ (egg lethal dose) of egg-adapted WR strain] was used.

Virucidal tests.—For each dose, 0.5 MTD dissolved in 10 ml. of buffered saline solution was added to $10^2$, $10^3$, or $10^4$ $EID_{95}$ and the three solutions were kept in water baths at 37° for 1 hr. Then the allantoic sacs of 5 eggs (for each dose) were inoculated with 0.1 ml. of one of the incubated solutions.

Evaluation of the activity.—For influenza virus, the eggs were stored at 35° for 48 hr., then at 4° for 12 hr., and finally tested for the presence of hemoagglutinin. For vaccinia virus, the eggs were stored at 37° for 7 days and the mortality of chick embryos was recorded.

In vivo in mice

Intranasal infection with influenza virus APR8.—Groups of twenty mice weighing 12–14 g. were infected by intranasal route under chloroform anesthesia with 0.05 ml. of a suspension of virus in tryptose phosphate broth (kept cold) according to the following schedule:

(1) Control 1: 20 mice infected with 1 $LD_{50}$
(2) Control 2: 20 mice infected with 1 $LD_{95}$ or a multiple thereof
(3) Treated: 20 mice per products infected as in 2.

Treatment: Simultaneously and thereafter daily with $\frac{1}{20}$ of the $LD_{50}$ but anyway not more than 0.4 mM./kg.
Dose: 0.1 ml./10 g. per mouse by subcutaneous route.
Evaluation: 5–6 days after infection.
Infection by subcutaneous route with hepatitis virus MHV₃ Craig strain.—Groups of twenty mice weighing 12–14 g. were infected subcutaneously with 0.1 ml. of suspension of virus tryptose phosphate broth (kept cold) as follows:

(1) Control 1: 20 mice infected with 1 $LD_{50}$
(2) Control 2: 20 mice infected with 1 $LD_{95}$ of the virus a multiple thereof
(3) Treated: 20 mice per product infected as per 2.
Treatment: Simultaneously and thereafter daily.
The dose was determined as for the influenza virus.
Evaluation: as for influenza virus on 7th day.

| Number | Egg MTDa μM | Egg MTDa Mg. | Egg APRs virus | Egg Vaccinia virus | Mice LD₅₀, mg./kg. | Mice Mg./10 ml. | Mice APRs virus | Mice MHV₃ virus |
|---|---|---|---|---|---|---|---|---|
| 13 | 5 | 1.86 | b>3 | 0 | 2,400 | 153 | c0 | 1 |
| 14 | 5 | 2.23 | >3 | 1 | >3,000 | 178 | 1 | 2 |
| 15 | 10 | 3.38 | >2 | 1 | 1,300 | 68 | 6 | 3 |
| 16 | 20 | 7.04 | >2 | 1 | 3,000 | 35 | 1 | 7 |
| 17 | 20 | 7.36 | >2 | >2 | 560 | 37 | 7 | 8 |
| 18 | 20 | 8.60 | >2 | >3 | 250 | 11 | 0 | 8 |
| 19 | 20 | 8.28 | >2 | 2 | 3,000 | 165 | 5 | 6 |
| 29 | 0.62 | 0.25 | >2 | 0 | >3,000 | 164.5 | 2 | 1 |
| 30 | 20 | 8.22 | >2 | 0 | 3,000 | 165 | 9 | 9 |
| 33 | 20 | 8.90 | >2 | >2 | 750 | 45 | 0 | 6 | a Maximal tolerated dose; b The numbers represent the difference between log EID (egg infecting dose) of control and log EID₉₅ of treated; c Number of the surviving treated mice.

What is claimed is:

1. Compounds of the formula

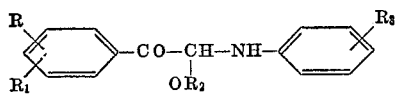

in which R is hydrogen or chlorine; $R_1$ is hydrogen, chlorine, or a nitro group, methyl, methoxy, paraphenyl, paraphenoxy, or paraphenylthio; $R_2$ is hydrogen or an alkyl group of 1 to 12 carbon atoms, allyl, propargyl, benzyl, or cyclohexyl; $R_3$ is a group having the formula $$-CO-CHX_2$$

or $-CO-CX_3$, in which X is chlorine or bromine, the radical $R_3$ being fixed in position 3 or 4 of the benzene nucleus.

2. A compound according to claim 1 wherein R is hydrogen, $R_1$ is nitro, $R_2$ is alkyl of 1 to 8 carbon atoms, and $R_3$ is $CO-CHX_2$.

3. A compound as defined in claim 1, having the formula:

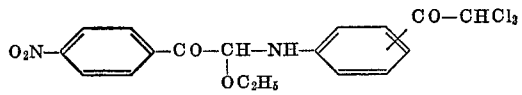

References Cited

Nardi et al., "Chemical Abstract," vol. 61, pp. 8222–23 (1964).

ROBERT V. HINES, Primary Examiner

U.S. Cl. X.R.

260—141, 309.2, 470, 471(R), 518(R)(A), 551(P), 580, 590, 592; 424—330